(12) United States Patent
Hilger

(10) Patent No.: US 7,159,278 B2
(45) Date of Patent: Jan. 9, 2007

(54) CASTER

(75) Inventor: Timothy J. Hilger, LaGrange Park, IL (US)

(73) Assignee: Yale Security Inc., Monroe, NC (US)

( * ) Notice: Subject to any disclaimer, the term of this patent is extended or adjusted under 35 U.S.C. 154(b) by 0 days.

(21) Appl. No.: 10/906,556

(22) Filed: Feb. 24, 2005

(65) Prior Publication Data
US 2006/0185121 A1 Aug. 24, 2006

(51) Int. Cl.
*B60B 33/00* (2006.01)

(52) U.S. Cl. ............ 16/102; 16/47; 16/32; 16/44; 16/105; 16/107

(58) Field of Classification Search ............ 16/102, 16/18 R, 19, 47, 29, 30, 32, 40, 105, 107, 16/97, 31 R, 38, 39, 99, 236, 237, 382, 280, 16/44; 49/381, 396, 425
See application file for complete search history.

(56) References Cited

U.S. PATENT DOCUMENTS

| 288,028 A | 11/1883 | Coultaus |
| 995,831 A | 6/1911 | Winter |
| 1,049,392 A | 1/1913 | Pierce |
| RE18,467 E | 5/1932 | Deisler |
| 1,875,965 A | 9/1932 | Waters |
| 1,944,185 A | 1/1934 | Langer |
| 2,062,320 A | 12/1936 | Langer |
| 2,537,296 A | 1/1951 | Yeakel |
| 2,627,081 A | 2/1953 | Slopa |
| 2,644,258 A | 7/1953 | Gillette |
| 3,261,618 A * | 7/1966 | Alfsen .................. 280/47 |
| 3,281,992 A | 11/1966 | Morrison |
| 3,533,189 A | 10/1970 | Appell et al. |
| 4,073,093 A * | 2/1978 | Ookawa et al. ........... 49/381 |

(Continued)

FOREIGN PATENT DOCUMENTS

GB 2255715 A * 11/1992

(Continued)

OTHER PUBLICATIONS

NSK Coporation, Glossary of Terms, www.nsk-corp.com, visited Jun. 7, 2004, 1 Page.*

(Continued)

*Primary Examiner*—Chuck Y. Mah
*Assistant Examiner*—Michael J. Kyle
(74) *Attorney, Agent, or Firm*—Moore & Van Allen PLLC; Matthew W. Witsil; Michael G. Johnston

(57) ABSTRACT

A caster for providing rolling support including a spring-loaded mount. The caster may be substantially concealed in the bottom edge of a hinged, swinging door, and generally located proximate to the free vertical edge of the door. An elongated spring plate is provided as a mount for a roller, causing the roller to accommodate variations in the floor surface, maintain contact with the floor, and support the door. The spring plate has a first portion adapted to be mounted to the bottom edge of a door, and a second portion depending from the first portion. An axle is mounted to the second portion, inside a hub that is mounted to the roller. The axle may be substantially parallel to the first portion of the spring plate. Single roller and double roller caster assemblies are provided.

10 Claims, 4 Drawing Sheets

U.S. PATENT DOCUMENTS

| | | | |
|---|---|---|---|
| 4,113,328 A | | 9/1978 | Vander Meulen |
| 4,590,709 A | | 5/1986 | Katsman et al. |
| 4,932,729 A | * | 6/1990 | Thompson et al. ......... 312/405 |
| 4,989,296 A | * | 2/1991 | Alderson ..................... 16/105 |
| 5,347,680 A | * | 9/1994 | Rippe ............................ 16/19 |
| 5,394,589 A | | 3/1995 | Braeger et al. |
| 5,468,070 A | | 11/1995 | Riedel et al. |

FOREIGN PATENT DOCUMENTS

| | | |
|---|---|---|
| JP | 10018673 | 1/1998 |
| JP | 10082264 | 3/1998 |

OTHER PUBLICATIONS

NTN Products, Double Row Self Aligning Ball Bearings, www.ntnamerica.com, vistied Jun. 7, 2004, 1 Page.

Industria Self Aligning Ball Bearings, Bearings for Commercial and Aerospace Industries, www.industria.co.uk, visited Jun. 7, 2004, 1 Page.

NSK Corporation, Glossary of Terms, www.nsk-corp.com, visited Jun. 7, 2004, 1 Page.

* cited by examiner

CASTER

BACKGROUND

The present invention relates to the field of casters for providing rolling support of objects, and more particularly concerns casters that may support swinging doors.

Casters are often used to provide rolling support for loads in a variety of applications. In general, casters include a kingpin mounted to an object, a bracket mounted to the kingpin, an axle mounted to the bracket, and a wheel or roller mounted to the axle. The bracket, axle, and wheel may swivel around the kingpin.

Casters are often used with doors, gates, or other similar hinged, swinging objects. Doors may sag at their free vertical edge, as hinges do not always maintain the door in the originally installed alignment. Sagging becomes an increasingly significant issue for heavy and wide doors, resulting in a larger moment about the hinges. Casters are mounted to the door such that the roller is positioned between the bottom edge of the door and the floor, typically adjacent the free vertical edge of the door. The caster allows swinging movement of the door between closed and open positions while providing uplifting force to place and maintain the door in position.

Some casters used for doors, gates, or the like, may also include a coil or leaf spring to allow vertical displacement of the roller relative to the door to maintain contact with the floor, in case of variation in elevation of the floor relative to the door, as the door swings. The coil-type spring may be disposed around a telescoping kingpin or other similar arrangement. Alternatively, the spring may be leaf-type, being wrapped around an axle on each side of a roller. With such arrangements the orientation of the axle is perpendicular to the longer dimension of the leaf spring, and the direction of the movement of the roller is aligned with the longer dimension of the leaf spring.

In some cases, for aesthetic reasons, it may be desirable to conceal casters within the doors. Concealed casters may be desirable in, for example, heavy, wide, commercial doors in high-end offices, but may also be desirable elsewhere. Concealment requires that the caster fit within the thickness of a door. Most often the caster arrangement on doors is disposed in plain view.

Accordingly, there exists a need for a new caster for a door. Ideally, the new caster may be substantially concealed in the door, and may maintain contact with the floor over the extent of the door's movement.

SUMMARY

In accordance with an embodiment of the present invention, a caster for a door includes an elongated resilient spring plate including a first portion and a second portion depending from the first portion. The first portion of the plate is adapted to be mounted to the door. An axle is mounted to the second portion of the plate such that the axle is substantially parallel to the first portion of the plate. A roller is operatively connected, in other words mounted directly or indirectly, to the axle, such that at least a part of the roller rotates. A hub may be disposed between the axle and the roller. The roller may be a self-aligning bearing.

In accordance with another embodiment of the present invention, a caster for a door includes an elongated resilient spring plate, a hub, an axle, and a roller. The elongated resilient spring plate includes a first portion and a second portion depending from the first portion. The first portion of the plate is adapted to be mounted to the door. The axle is mounted to the second portion of the plate such that the axle is substantially parallel to the first portion of the plate, and the second portion of the plate has a slot for receiving the axle. The slot is sized for allowing the distance between the axle and the first portion of the plate to be adjusted. The axle comprises a threaded rod. The hub is mounted to the axle. The roller is mounted to the hub, and has a substantially tight interference fit with the hub.

In accordance with another embodiment of the present invention, a door includes a door and a caster. The door includes a first major surface and a second major surface, and a hinged vertical edge, a free vertical edge, a top edge, and a bottom edge. The bottom edge is between and interconnects the first major surface and the second major surface and has a recessed surface defined between the first and second major surface of the door adjacent to the free vertical edge. The caster includes an elongated resilient spring plate, an axle, and a roller. The plate includes a first portion and a second portion depending from the first portion, wherein the first portion of the plate is mounted to the door in the recess such that the second portion is free from attachment to the door. The axle is mounted to the second portion of the plate such that the axle is substantially parallel to the first portion of the plate. The roller is operatively connected to the axle, and at least a portion of the roller rotates.

In accordance with another embodiment of the present invention, a caster for a door includes an elongated resilient spring plate including a first portion and a second portion depending from the first portion, the first portion of the plate adapted to be mounted to the door. A bracket includes a first portion and a second portion angularly extending from the first portion of the bracket, and the first portion of the bracket is mounted to the second portion of the plate. A hub has opposed ends and is mounted to the second portion of the bracket such that the hub is substantially parallel to the first portion of the plate, and the ends of the hub define openings. An axle is disposed in the open ends of the hub. A roller is operatively connected to each axle, wherein at least a part of each roller rotates.

In accordance with another embodiment of the present invention, a caster for a door includes an elongated resilient spring plate including a first portion and a second portion depending from the first portion, the first portion of the plate adapted to be mounted to the door. A bracket includes a first portion and a second portion angularly extending from the first portion of the bracket, and the first portion of the bracket is mounted to the second portion of the plate. A clamp includes a rectangular portion and flanges along two opposed edges of the clamp. The clamp is adapted to be mounted to the first portion of the bracket and the second portion of the plate. The flanges of the clamp receive the edges of the first portion of the bracket and the second portion of the plate. A hub has opposed ends and is mounted to the second portion of the bracket. The hub is substantially parallel to the first portion of the plate and the ends of the hub define threaded openings. An axle includes at least one threaded rod, disposed in the threaded ends of the hub. Two rollers are provided, with one each mounted to the outside of each end of the hub and operatively connected to the axle. Each roller may include a self-aligning bearing.

In accordance with another embodiment of the present invention, a door includes a door and a caster. The door includes a first major surface and a second major surface, and a hinged vertical edge, a free vertical edge, a top edge, and a bottom edge. The bottom edge is between and interconnecting the first major surface and second major surface and having a recess defined between the first and second major surfaces adjacent to the free vertical edge. The caster includes an elongated resilient spring plate including a first portion and a second portion depending from the first portion. The first portion of the plate is mounted to the door in the recess such that the second portion is free from attachment to the door. A bracket includes a first portion and a second portion angularly extending from the first portion of the bracket, with the first portion of the bracket mounted to the second portion of the plate. A hub is mounted to the second portion of the bracket such that the hub is substantially parallel to the first portion of the plate. The ends of the hub define threaded openings. The axle is mounted to the open ends of the hub such that the axle is substantially parallel to the first portion of the plate. Two rollers are provided, with one each mounted to each end of the hub.

In accordance with another embodiment of the present invention, a method of making a caster for a door includes providing an elongated resilient spring plate including a first portion and a second portion depending from the first portion. The first portion of the plate is adapted to be mounted to the door. An axle is mounted to the second portion of the plate such that the axle is substantially parallel to the first portion of the plate, and a roller is operatively connected to the axle.

In accordance with another embodiment of the present invention, a method of making a caster includes providing an elongated resilient spring plate including a first portion and a second portion depending from the first portion. The first portion of the plate is adapted to be mounted to the door. A bracket is provided including a first portion and a second portion angularly extending from the first portion of the bracket. The first portion of the bracket is mounted to the second portion of the plate. A hub has a central portion and two opposed ends with each end defining threaded openings. The central portion of the hub is mounted to the second portion of the bracket. A roller is mounted to each end of the hub. An axle is inserted through the roller and at least into the open ends of the hub. The axle is secured.

Features and advantages of the present invention will become more apparent in light of the following detailed description of some embodiments thereof, as illustrated in the accompanying figures. As will be realized, the invention is capable of modifications in various respects, all without departing from the invention. Accordingly, the drawings and the description are to be regarded as illustrative in nature, and not as restrictive.

DESCRIPTION

Figure 1:
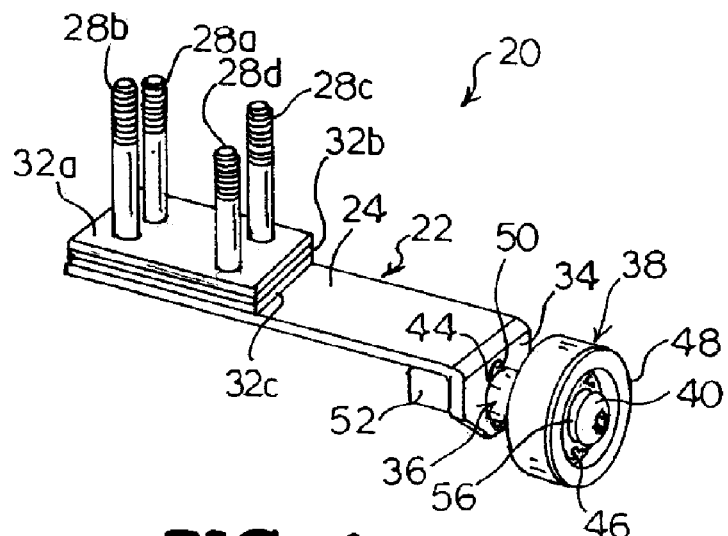
FIG. 1 is a perspective view of an embodiment of a caster including a single roller according to the present invention.

In the Figures herein, unique features receive unique reference numerals, while features that are the same in more than one drawing receive the same reference numerals throughout. Where a feature is modified between figures or is modified only by a change in location, a letter may be added or changed after the feature reference numeral to distinguish that feature from a similar feature in a previous figure or the same feature in an alternate location. Further, certain terms of orientation may be used, such as "horizontal," "vertical," "upper," "lower," "top," "bottom," "left," "right," "inside," "outside" "inner" and "outer." These terms are generally for convenience of reference, and should be so understood unless a particular embodiment requires otherwise. Where the terms "horizontal" and "vertical" are used, they should be understood to mean "approximately horizontal" and "approximately vertical," respectively.

The scope of the invention is not intended to be limited by materials listed herein, but may be carried out using any materials that allow construction and operation. Materials and dimensions depend on the particular application. In general the materials of the components may be metal, and selectively may be plastic, as known by one of ordinary skill in the art.

Figure 2:
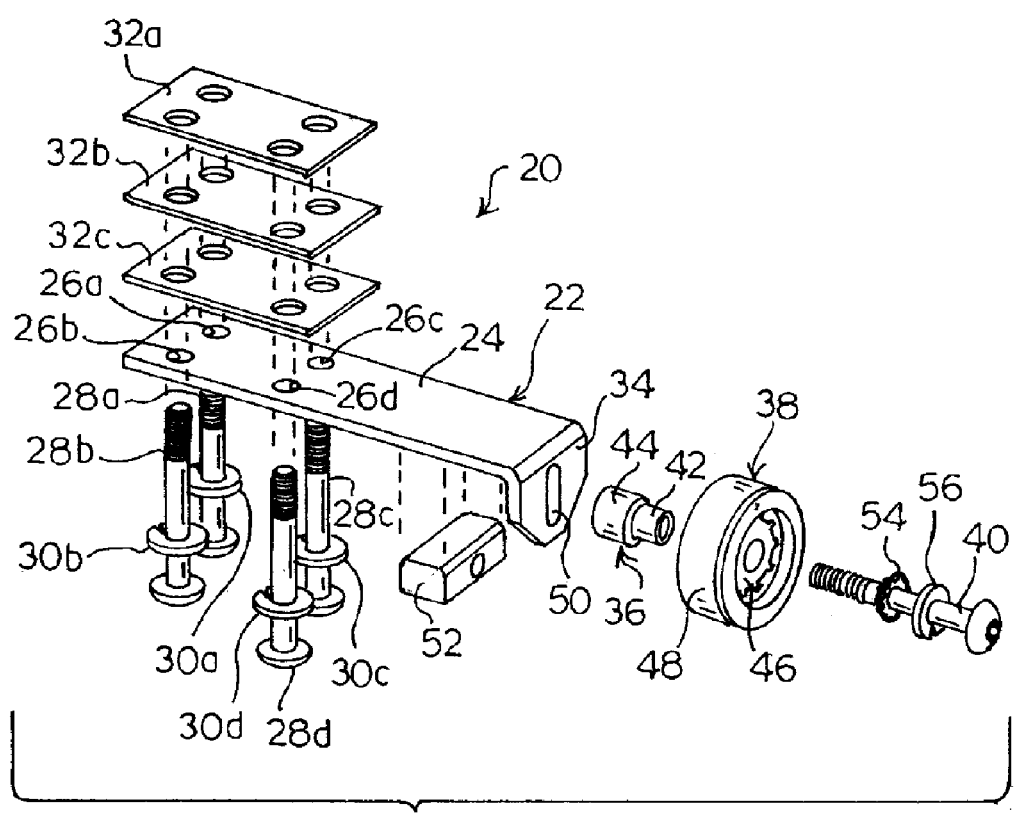
FIG. 2 is an exploded perspective view of the caster of FIG. 1.

Referring now to the drawings, an embodiment of a spring caster 20 according to the present invention is shown in FIGS. 1 and 2. The caster 20 includes a cantilever-type spring plate 22 with a horizontal portion 24 having openings 26a–26d for mounting screws 28a–28d and washers 30a–30d at one end and downturned vertical portion 34 at the other end. Shims 32a–32c are provided for vertical adjustment relative to the door during installation.

Figure 8:
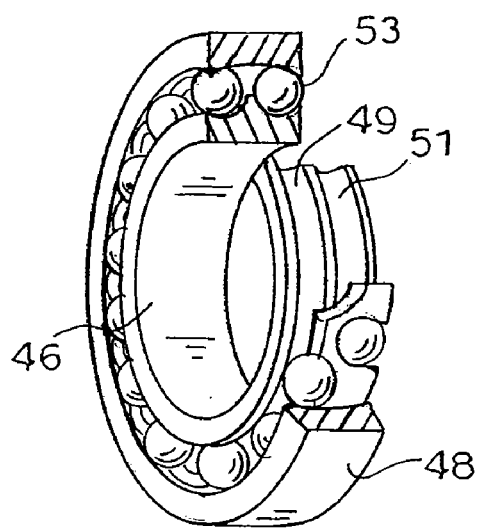
FIG. 8 is a partially cut-away perspective view of a bearing in accordance with one embodiment of the present invention.

A roller assembly including a hub 36, a roller 38, and an axle 40 is provided. The hub 36 has a smaller diameter portion 42 and a larger diameter portion 44. The roller 38 includes an inner ring 46, an outer ring 48, and ball bearings (not shown). The outer ring 48 rotates relative to the inner ring 46. The smaller diameter portion 42 of the hub 36 may fit in the inner ring 46 with a substantially tight interference fit, such that there is no relative movement between the hub 36 and inner ring 46. The inner ring 46 comprises a self-aligning ball bearing 47, shown in FIG.8, including two raceways 49, 51 in which ball bearings 53 are disposed. The outer ring 48 has one raceway. The inside of the outer ring raceway forms a spherical surface whose center coincides with the bearing center and has no defined path. The ball bearing design allows misalignment of the inner ring 46 and outer ring 48. An example suitable self-aligning bearings is Part#IT-0139A-0703, Crown Roller with Self-Aligning Bearing by Intech Corporation of Closter, Ill. Other bearings may be selected by one of ordinary skill in the art.

The axle 40 in this embodiment is a machine screw including a threaded end portion, as may be selected by one of ordinary skill in the art. The axle 40 may also be, for example, a threaded rod, with or without portions unthreaded, with or without a head, or a bolt. Where reference is made to a threaded rod, it should be understood to include screws, bolts, rods with or without heads, rods omitting threads over some portion, or the like. The axle 40 may be aligned substantially parallel with the longitudinal axis of the spring plate 22, with the direction of movement of the roller 38 perpendicular to the spring plate longitudinal axis.

The axle 40 extends through the hub 36, roller 38, and a vertical slot 50 in the vertical portion 34 of the spring plate 22. A nut 52 is threaded onto the threaded end portion of the axle 40 for securing the hub 36 and roller 38 to the vertical portion of the plate 22. A star washer 54 and lock washer 56 are provided to pre-load the assembly 20 and to prevent turning and loosening of the axle 40. The slot 50 in the vertical portion 34 of the spring plate 22 allows vertical adjustment of the connection of the roller 38 relative to the horizontal portion of the spring plate 22. The nut 52 may be sized and shaped to help prevent loosening by causing the nut to collide with the horizontal portion 24 of the spring plate 22 when the nut tries to turn. For example, the nut 52 may be a rectangular threaded block, as shown, or the like.

Figure 3:
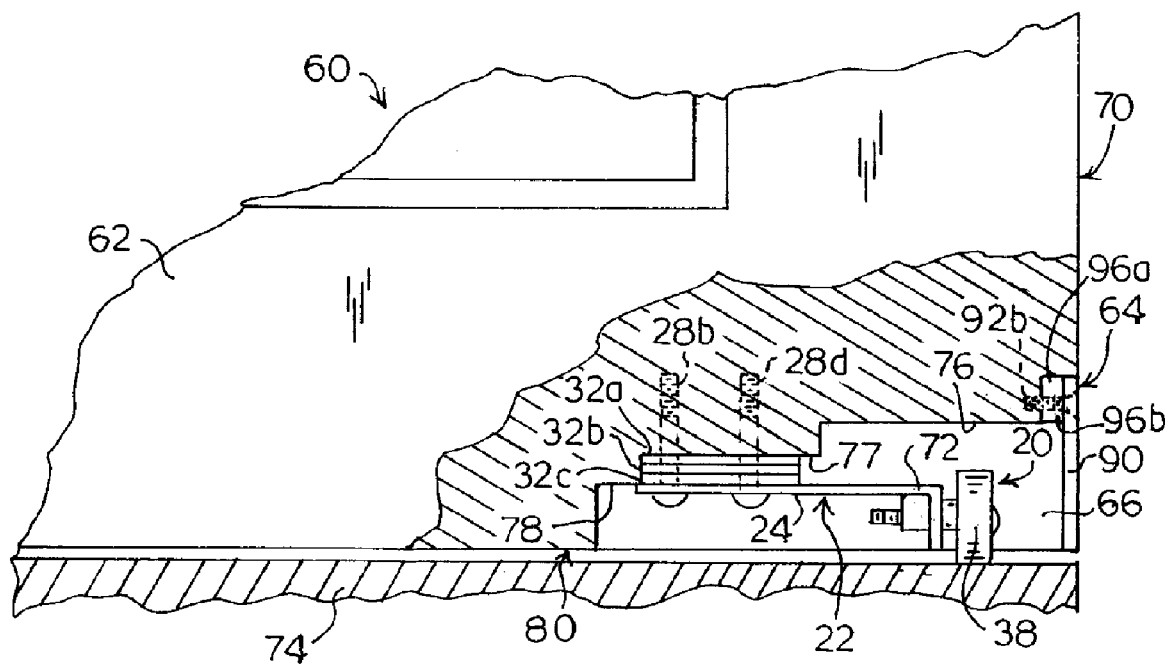
FIG. 3 is a partially exposed elevation view of a door including the caster of FIG. 1.

FIG. 3 shows a complete door and caster assembly 60, including a door 62 and the embodiment of a caster 20 from FIGS. 1 and 2. A portion of the face of the door 62 is removed to expose the caster 20 and an end plate assembly 64. The caster assembly 20 is disposed in a recessed area 66 formed in the bottom edge of the door 62. The horizontal portion 24 of the spring plate is secured to the door 62 with screws 28a–28d. The spring plate 22 is cantilevered from the mounting screws 28a–28d distal from the free vertical edge 70 of the door, and has a free end 72 proximate to the free vertical edge of the door. Because the spring plate 22 is flexible and resilient, the free end 72 of the spring plate 22 may move up and down to support the door 62 and for the roller 38 to contact the floor 74 as necessary. In the embodiment shown there are three steps 76–78 to the recessed area, with the depth of each step from the bottom edge 80 of the door 62 increasing as the distance to the edge 70 of the door 62 decreases. The stepped recessed area 66 provides space for the roller assembly. It should be understood that more or as few as no steps could be used by adjusting the number of shims 32a–32c, thickness of shims, or both.

Figure 4:
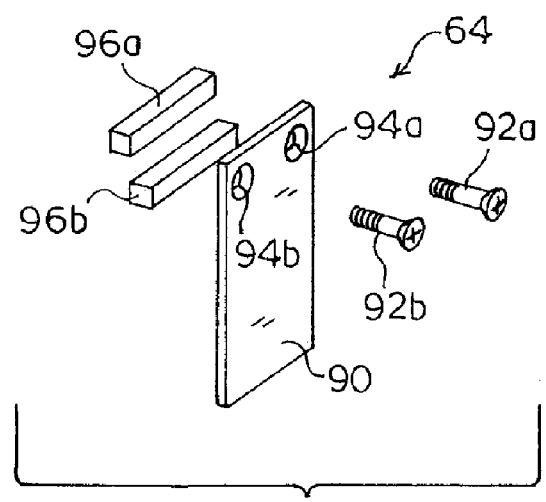
FIG. 4 is an exploded perspective view of a cover plate assembly for use with an embodiment of a caster according to the present invention.

An embodiment of an end plate assembly 64 is shown in FIG. 4 and includes an end plate 90, two screws 92a, 92b that extend through two openings 94a, 94b, and two resilient electrometric strips 96a, 96b. The elastomeric strips 96a, 96b provide a load on the screws 92a, 92b to keep them from loosening.

The end plate assembly 64 conceals the caster assembly 20 from the free vertical edge 70 of the door 62 if necessary, which is the case if there is an opening on the free vertical edge 70. The entire caster assembly 20 is substantially concealed between the faces of the door 62, except for the portion of the roller 38 that extends beneath the bottom edge 80 of the door. In many applications the roller 38 will not be visible from the viewing position of someone using the door 62, though the roller 38 need not be concealed.

Figure 5:
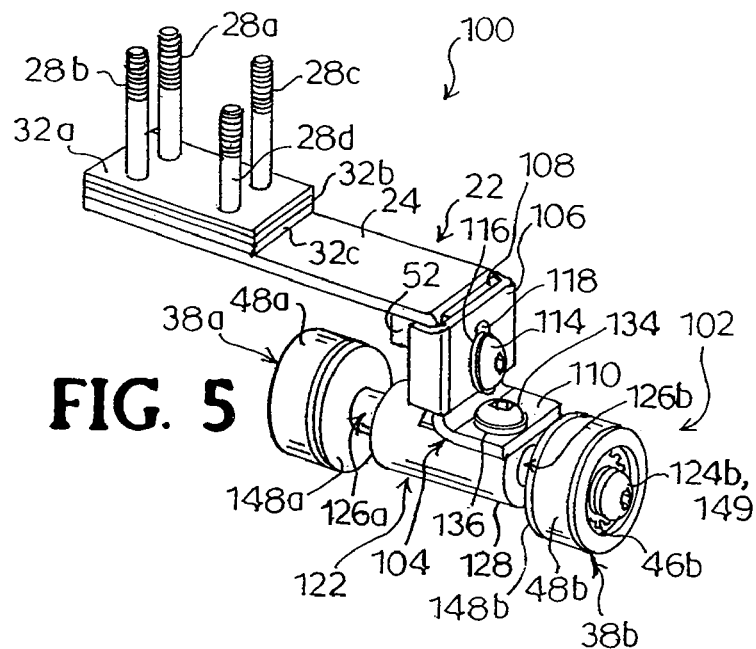
FIG. 5 is a perspective view of another embodiment of a caster including two rollers according to the present invention.
Figure 6:
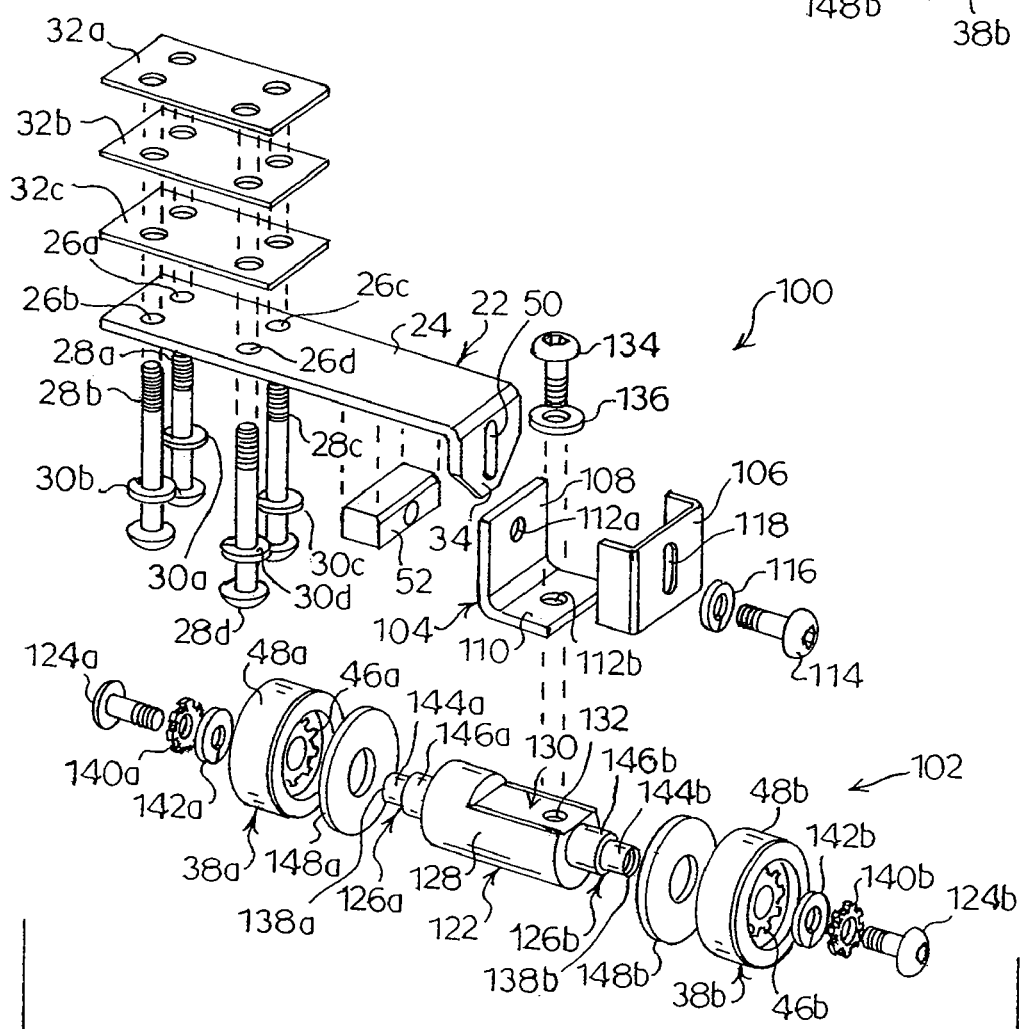
FIG. 6 is an exploded perspective view of the caster of FIG. 5.

FIGS. 5 and 6 show another embodiment of a caster 100 according to the present invention. The caster 100 has a double roller assembly 102 that may be desirable when the load on the caster exceeds the capacity of the single roller caster 20 described above (FIGS. 1–3). The spring plate arrangement of the double roller caster 100 is similar to that of the single roller caster 20. The parts of this embodiment of the caster 100 which are identical to those of the caster 20 according to above embodiment are denoted by identical reference numbers and will not be described in detail below.

An angle bracket 104 and a C-shaped clamp 106 are provided for securing the double roller assembly 102 to the spring plate 22. The angle bracket 104 has a vertical portion 108 and a horizontal portion 110, with an opening 112a, 112b through each portion. The vertical portion 108 of the bracket 104 and the vertical portion 34 of the spring plate 22 are received between the ends of the clamp 106. A screw 114 extends through a lock washer 116, a vertical slot 118 in the clamp 106, the opening 112a in the vertical portion 108 of the bracket 104, and the slotted opening 50 in the vertical portion 34 of the spring plate 22. The vertical slots 50, 118 allow the double roller assembly 102 to be adjusted relative to the horizontal portion 24 of the spring plate 22. A nut 52 is threaded onto the end of the screw 114 for securing the angle bracket 104 and clamp 106 to the vertical portion 34 of the plate.

The double roller assembly 102 includes a hub 122, two rollers 38a, 38b, and axles 124a, 124b. The hub 122 is double ended 126a, 126b, and has a central portion 128 that includes a planar surface 130 having a threaded opening 132. The planar surface 132 is the mounting surface for the horizontal portion 110 of the bracket 104. A screw 134 extends through a lock washer 136 and the opening 112b in the horizontal portion 110 of the bracket 104. The screw 134 and lock washer 136 mount the spring plate 22 via the bracket 104 to the hub 122. The threaded opening 132 receives the screw 134 to secure the bracket 104. The ends 126a, 126b, the central portion 128, or both, of the hub 122 may be threaded openings 138a, 138b and may accept two screws 124a, 124b with star washers 140a, 140b and lock washers 142a, 142b. As with the hub 36 of the single roller assembly, the ends 124a, 124b of the hub 122 of the double roller assembly 102 have a smaller diameter portion 144a, 144b and a larger diameter portion 146a, 146b. The smaller diameter portion 144a, 144b of the ends 126a, 126b of the hub 122 may extend into the inner ring 46a, 46b of the roller 38a, 38b with a substantially tight interference fit. The larger diameter portion 146a, 146b is contiguous with the central portion 128 of the hub 122. The rollers 38a, 38b may again be self-aligning bearings having an inner ring 46a, 46b and an outer ring 48a, 48b, or alternatively other types of bearings as selected by one of ordinary skill in the art. The axles 124a, 124b pass through each end 126a, 126b of the hub 122 and each roller 38a, 38b. Large washers 148a, 148b are provided between the hub 122 and rollers 38a, 38b to prevent wear of the rollers against the ends 126a, 126b of the hub 122. An alternative design may allow one bolt 149 to pass through the entire hub 122 and make up the axle, which when assembled would look like the double roller assembly 102 and part 124b shown in FIG. 5.

Figure 7:
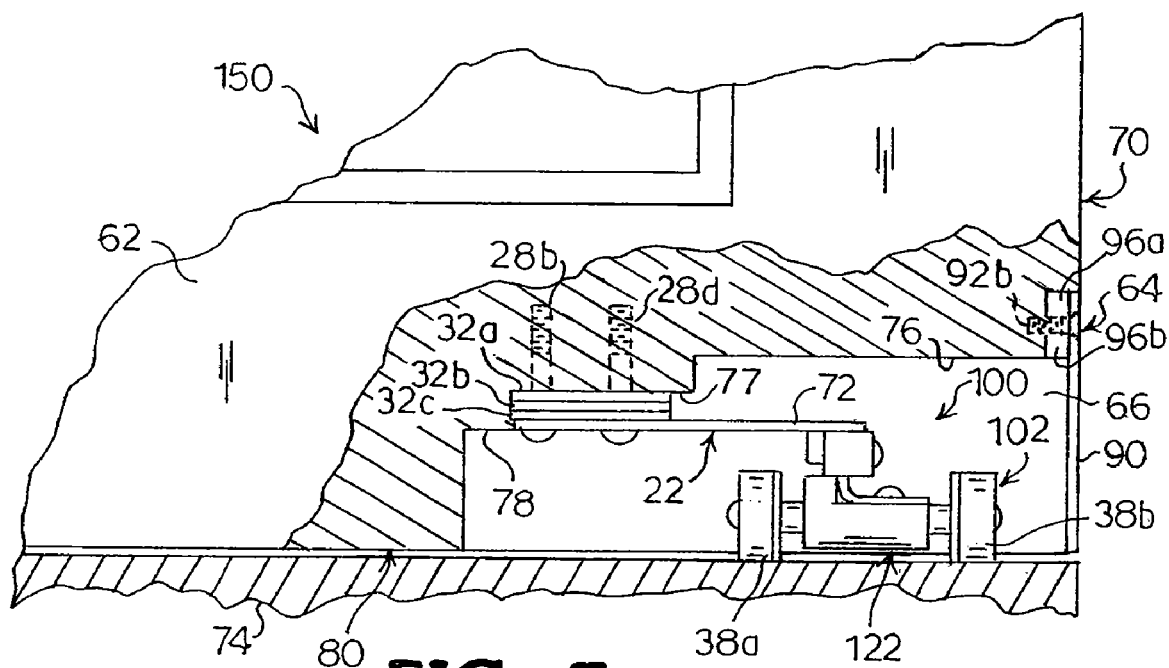
FIG. 7 is a partially exposed elevation view of a door including the caster of FIG. 5.

Like FIG. 3, FIG. 7 shows a complete door and caster assembly 150, including a door 62 and the embodiment of a caster 100 from FIGS. 5 and 6. A portion of the face of the door 62 is removed to expose the caster 100 and end plate assembly 64. The caster 100 is disposed in the recessed area 66 formed in the bottom edge of the door. As in the embodiment 60 previously described, because the spring plate 22 is flexible and resilient, the free end 72 of the spring plate 22 may deflect and apply upward force to support the door 62. The entire caster assembly 100 is substantially concealed between the faces of the door 62, except for a portion of the rollers 38a, 38b, which need not be concealed and which extends beneath the bottom edge 80 of the door 62.

Specific embodiments of an invention are described herein. One of ordinary skill in the caster and door support arts will recognize that the invention has other applications in other environments. In fact, many embodiments and implementations are possible. For example, the caster could be applied to articles other than doors. The caster of the present invention may have varying designs of mounts of the axles and rollers to the spring plates. More than two rollers may be provided. In addition, the recitation "means for" is intended to evoke a means-plus-function reading of an element in a claim, whereas, any elements that do not specifically use the recitation "means for," are not intended to be read as means-plus-function elements, even if they otherwise include the word "means." The following claims are in no way intended to limit the scope of the invention to the specific embodiments described.

What is claimed is:

1. A caster for a door, comprising:
    an elongated resilient spring plate including a first portion and a second portion depending from the first portion, the first portion of the plate adapted to be mounted to the door;
    an axle mounted to the second portion of the plate such that the axle is substantially parallel to the first portion of the plate, wherein the axle comprises a threaded rod;
    a nut for threading onto the threaded rod for securing the axle to the second portion of the plate, wherein the nut is sized so that rotation of the nut when on the threaded rod causes the nut to abut the first portion of the plate to prevent nut rotation relative to the plate; and
    a roller operatively connected to the axle, wherein at least a part of the roller rotates.

2. The caster of claim 1, wherein the nut is rectangularly shaped in the plane parallel to the second portion of the plate.

3. A caster for a door, comprising:
    an elongated resilient spring plate including a first portion and a second portion depending from the first portion, the first portion of the plate adapted to be mounted to the door;
    a bracket including a first portion and a second portion angularly extending from the first portion of the bracket, the first portion of the bracket mounted to the second portion of the plate;
    a hub having opposed ends and mounted to the second portion of the bracket such that the hub is substantially parallel to the first portion of the plate, wherein the ends of the hub define threaded openings;
    two axles, one each disposed in each end of the hub in the openings, wherein each axle comprises a threaded rod; and
    two rollers, one each operatively connected to each axle and including one or more parts, wherein at least a part of each roller rotates.

4. A caster for a door, comprising:
    an elongated resilient spring plate including a first portion and a second portion depending from the first portion, the first portion of the plate adapted to be mounted to the door;
    a bracket including a first portion and a second portion angularly extending from the first portion of the bracket, the first portion of the bracket mounted to the second portion of the plate;
    a clamp including a rectangular planar portion and flanges along two opposed edges of the clamp, the clamp adapted to be mounted to the first portion of the bracket and the second portion of the plate, wherein the flanges of the clamp receive the edges of the first portion of the bracket and second portion of the plate;
    a hub having opposed ends and mounted to the second portion of the bracket such that the hub is substantially parallel to the first portion of the plate and the ends of the hub define threaded openings;
    an axle including at least one threaded rod, disposed in the threaded ends of the hub; and
    two rollers, one each mounted to the outside of each end of the hub and operatively connected to the axle.

5. The caster of claim 4, wherein each roller comprises a self-aligning bearing.

6. The caster of claim 4, wherein the second portion of the plate has a slot for receiving the axle wherein the slot is sized for allowing the distance between the axle and the first portion of the plate to be adjusted.

7. A door comprising:
    a door including a first major surface and a second major surface, and a hinged vertical edge, a free vertical edge, a top edge, and a bottom edge, the bottom edge between and interconnecting the first major surface and the second major surface and having a recess defined between the first and second major surfaces adjacent to the free vertical edge; and
    a caster including:
    an elongated resilient spring plate including a first portion and a second portion depending from the first portion, wherein the first portion of the plate is mounted to the door in the recess such that the second portion of the spring plate is free from attachment to the door;
    a bracket including a first portion and a second portion angularly extending from the first portion of the bracket, the first portion of the bracket mounted to the second portion of the plate;
    a hub having opposed ends mounted to the second portion of the bracket such that the hub is substantially parallel to the first portion of the plate and the ends of the hub define threaded openings;
    an axle including at least one threaded rod, disposed in the threaded ends of the hub; and
    two rollers, one each mounted to each end of the hub.

8. The door of claim 7, wherein each roller comprises a self-aligning bearing.

9. The door of claim 7, wherein the caster is substantially concealed by the door.

10. A method of making a caster, comprising:
    providing an elongated resilient spring plate including a first portion and a second portion depending from the first portion, the first portion of the plate adapted to be mounted to the door;
    providing a bracket including a first portion and a second portion angularly extending from the first portion of the bracket;
    mounting the first portion of the bracket to the second portion of the plate;
    providing a hub having a central portion and two opposed ends, each end defining a threaded opening;
    mounting the central portion of the hub to the second portion of the bracket;
    mounting a roller to each end of the hub;
    inserting an axle through each roller and into the hub; and
    securing the axle.

* * * * *